United States Patent
Pun et al.

(10) Patent No.: US 8,179,300 B2
(45) Date of Patent: May 15, 2012

(54) METHOD FOR SUPPRESSING CLUTTER IN SPACE-TIME ADAPTIVE PROCESSING SYSTEMS

(75) Inventors: Man-On Pun, Cambridge, MA (US); Zafer Sahinoglu, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 346 days.

(21) Appl. No.: 12/696,997

(22) Filed: Jan. 29, 2010

(65) Prior Publication Data

US 2011/0187584 A1    Aug. 4, 2011

(51) Int. Cl.
*G01S 13/00*    (2006.01)
(52) U.S. Cl. .......................................... 342/22; 342/159
(58) Field of Classification Search ............... 342/22, 342/159
See application file for complete search history.

(56) References Cited

U.S. PATENT DOCUMENTS 6,873,724 B2    3/2005    Brand

OTHER PUBLICATIONS

H. Belkacemi Fast iterative subspace procedures for airborne STAP radar. EURASIP Journal on applied signal processing, 1-8, 2006.*
R. Badeau Fast approximated power iteration subspace tracking. IEEE Trans. Signal Proc., 53:2931-2941, 2005.
R. Badeau Approximated power iterations for fast subspace tracking. Proc. 7th International Symp. Signal Processing and Applications, pp. 583-586, Paris, France, 2003.
H. Belkacemi Fast iterative subspace procedures for airborne STAP radar. EURASIP Journal on applied signal processing, :1-8, 2006.
M Brand Fast low-rank modifications of the thin singular value decomposition. Linear Algebra and its Applications, 415:20-30, 2006.
B. Yang Projection approximation subspace tracking. IEEE Trans. Signal Processsing, 43:95-107, 1995.

* cited by examiner

*Primary Examiner* — Timothy A Brainard
(74) *Attorney, Agent, or Firm* — Dirk Brinkman; Gene Vinokur

(57)    ABSTRACT

A method surpresses clutter in a space-time adaptive processing system. The method achieves low-complexity computation via two steps. First, the method utilizes an improved fast approximated power iteration method to compress the data into a much smaller subspace. To further reduce the computational complexity, a progressive singular value decomposition (SVD) approach is employed to update the inverse of the covariance matrix of the compressed data. As a result, the proposed low-complexity STAP procedure can achieve near-optimal performance with order-of-magnitude computational complexity reduction as compared to the conventional STAP procedure.

1 Claim, 5 Drawing Sheets

Initialization: $W(0) = \begin{bmatrix} I_\tau \\ 0_{(n-\tau) \times \tau} \end{bmatrix}$, $Z(0) = I_\tau$.

Procedure:

1: for $k = 1, 2, \ldots, K$ do
2:     $y(k) = W(k-1)^H x(k)$
3:     $h(k) = Z(k-1) y(k)$
4:     $g(k) = \dfrac{h(k)}{\beta + y(k)^H h(k)}$
5:     $\epsilon^2(k) = \|x(k)\|^2 - \|y(k)\|^2$
6:     $\tau(k) = \dfrac{\epsilon^2(k)}{1 + \epsilon^2(k)\|g(k)\|^2 + \sqrt{1 + \epsilon^2(k)\|g(k)\|^2}}$
7:     $\eta(k) = 1 - \tau(k)\|g(k)\|^2$
8:     $y'(k) = \eta(k) y(k) + \tau(k) g(k)$
9:     $h'(k) = Z(k-1)^H y'(k)$
10:     NR-MFPAI:
      $\epsilon(k) = \dfrac{\tau(k)}{\eta(k)} \left( Z(k-1) g(k) - \left( h'(k)^H g(k) \right) g(k) \right)$
      and (12) or
      LC-MFPAI: (13)
11:     $e'(k) = \eta(k) x(k) - W(k-1) y'(k)$
12:     $W(k) = W(k-1) + e'(k) g(k)^H$
13: end for

Initialization: $R(1) = USU^H$
Procedure:
1: for $k = 2, 3, \ldots, K$ do
2:    Obtain $R(k)$ according to (6);
3:    Compute $\Delta R(k) = R(k) - R(k-1)$;
4:    Decompose $\Delta R(k) \approx \alpha a a^H$;
5:    Obtain $p$ and $\gamma$ such that $$\gamma p = (I - UU^H)a;$$

6:    Construct an $(r+1) \times (r+1)$ diagonal matrix $K$ whose $n$-th diagonal element is given by $$[K]_{n,n} = \left[ \begin{bmatrix} S & 0 \\ 0 & 0 \end{bmatrix} + \begin{bmatrix} U^H a \\ \gamma \end{bmatrix} \begin{bmatrix} U^H a \\ \gamma \end{bmatrix}^H \right]_{n,n};$$

7:    for $n = 1, 2, \ldots, r+1$, Denote by $\mathcal{I}_k = \{i_j\}$ the index set satisfying $[K]_{i_n, i_n} \leq [K]_{i_m, i_m}$ for $1 \leq n < m \leq r+1$.
8:    Define two auxiliary matrices: $\tilde{U} \stackrel{\text{def}}{=} \begin{bmatrix} U & p \end{bmatrix}$ and a $m \times m$ diagonal matrix $\Lambda$ with $[\Lambda]_{n,n} = [K]_{i_n, i_n}$;
9:    Update $$U \stackrel{\text{def}}{=} \tilde{U}(:, i_{1:m}),$$

where $m$ is a design parameter with $1 \leq m \leq r+1$;
10:    Finally, compute $$R(k)^{-1} = U \Lambda^{-1} U^H.$$

11: end for

METHOD FOR SUPPRESSING CLUTTER IN SPACE-TIME ADAPTIVE PROCESSING SYSTEMS

FIELD OF THE INVENTION

This invention relates generally to phased array radar systems, and more particularly to suppression clutter while detecting targets.

BACKGROUND OF THE INVENTION

A typical prior art space-time adaptive processing (STAP) system includes an array of N transmit and receive antennas. The antenna array can be mounted on a moving platform, e.g., a plane or a boat, to locate air, ground and sea targets. STAP systems are also used by meteorologists and geologists.

The receiver antenna gain pattern can be steered in a desired direction by a beam forming process. Advanced STAP systems are required to detect targets in the presence of both clutter and jamming. Ground or sea clutter is extended in both angle and range, and is spread in Doppler frequency because of the platform motion.

The STAP system uses a pulse train, and coherent pulse integration. A coherent processing interval (CPI) defines the duration of the pulse train. During each CPI, the transmitter sends out M pulses using the transmit antennas. The time between the beginning of a pulse and the beginning of the next pulse is called a pulse repetition interval (PRI). The pulses reflect from targets at different distances from the STAP system.

The range to a target is determined by the time interval between the sending of a pulse and receiving the reflected signal. The STAP system collects the reflected signals for each antenna, or each pulse and range. The data derived from the reflected signals can be assembled into a three-dimensional matrix, which is sometimes called a STAP cube.

The problem solved by the invention is shown schematically in FIG. 1. In sensing applications built on a moving platform, returned signals are commonly contaminated by clutter returns in the form of interference 101, which decreases the signal-to-noise ratio (SNR) from different incoming angles 102 and Doppler frequencies 103. To accurately locate moving targets, effective clutter suppression techniques are indispensable.

Among the many known clutter-suppression techniques, space-time adaptive processing (STAP) is the most promising. In STAP, returned signals are filtered simultaneously over space and time domains. As a result, clutter interference can be effectively suppressed regardless of the incoming angle and Doppler frequency.

However, the conventional STAP is handicapped by a prohibitive computational complexity. For M pulses and N antennas, the conventional STAP requires an intensive matrix inversion of dimension MN×MN. For practical systems with MN on the order of hundreds, such a large matrix inversion requirement makes it difficult to implement STAP for real-time target detection.

To circumvent this obstacle, considerable research efforts have been devoted to developing low-complexity STAP. According to Brennan's rule, the rank of the clutter interference covariance matrix C is known to be much smaller than MN. Thus, one way to achieve complexity reduction is to compress the returned signal into an r-dimensional subspace with r<<MN. In particular, one low-complexity STAP exploits a subspace tracking called fast approximated power iteration (FAPI). FAPI can be employed to effectively compress the returned signal into a much smaller signal subspace, which enables low-complexity STAP operating on the compressed data.

SUMMARY OF THE INVENTION

The embodiments of the invention provide a two-step low-complexity space-time adaptive processing (STAP) method. In the first step, we use a modified fast approximated power iteration (FAPI) procedure with improved convergence before applying the modified FAPI procedure to compress received signals.

In the second step, we use a progressive singular vector decomposition (PSVD)-based low-complexity technique to recursively determine the inverse of a covariance matrix of the compressed data to detect targets.

The resulting low-complexity STAP reduces the computational complexity of $O((MN)^3)$ for the conventional to $O((MN)r)$.

The STAP according to embodiments of the invention achieves near-optimal performance when compared to the conventional STAP using a full matrix inversion.

BRIEF DESCRIPTION OF THE DRAWINGS

FIG. 4 is a block diagram of pseudo code for a fast modified power iteration procedure according to embodiments of the invention; and FIG. 5 is a block diagram of pseudo code for a progressive SVD according to embodiments of the invention.

DETAILED DESCRIPTION OF THE PREFERRED EMBODIMENTS

The embodiments of our invention provide a method for detecting target using low complexity clutter suppression in space-time adaptive processing (STAP) systems.

We use the following notational conventions. Vectors and matrices are denoted with boldface, $\|\bullet\|$ represents the Euclidean norm of the enclosed vector, and $|\bullet|$ denotes the cardinality of the enclosed set. $I_N$ is the N×N identity matrix. We use $(\bullet)^H$ and $R\{\bullet\}$ for Hermitian transposition and the real part, respectively. Finally, $[A]_{i,j}$ denotes the i-th row and j-th column entry of matrix A, and $A(:,j)$ is the j-th column of the matrix A.

A sensing system transmits pulses of the form $$s(t)=R\{A_t E(t)e^{j\omega_c t}\},$$

where $\omega_c$ is the carrier frequency, $A_t$ and $E(t)$ are the transmit power and pulse waveform, respectively.

Figure 1:
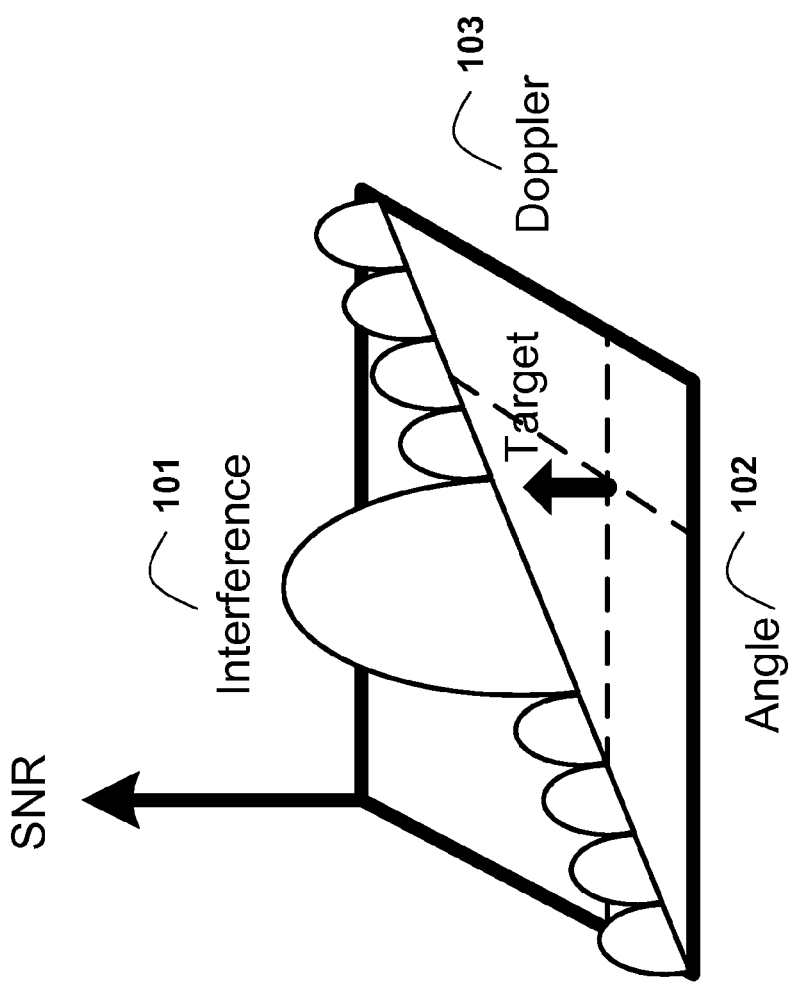
FIG. 1 is a schematic of a clutter interference spectrum resolved by embodiments of the invention.
Figure 2:
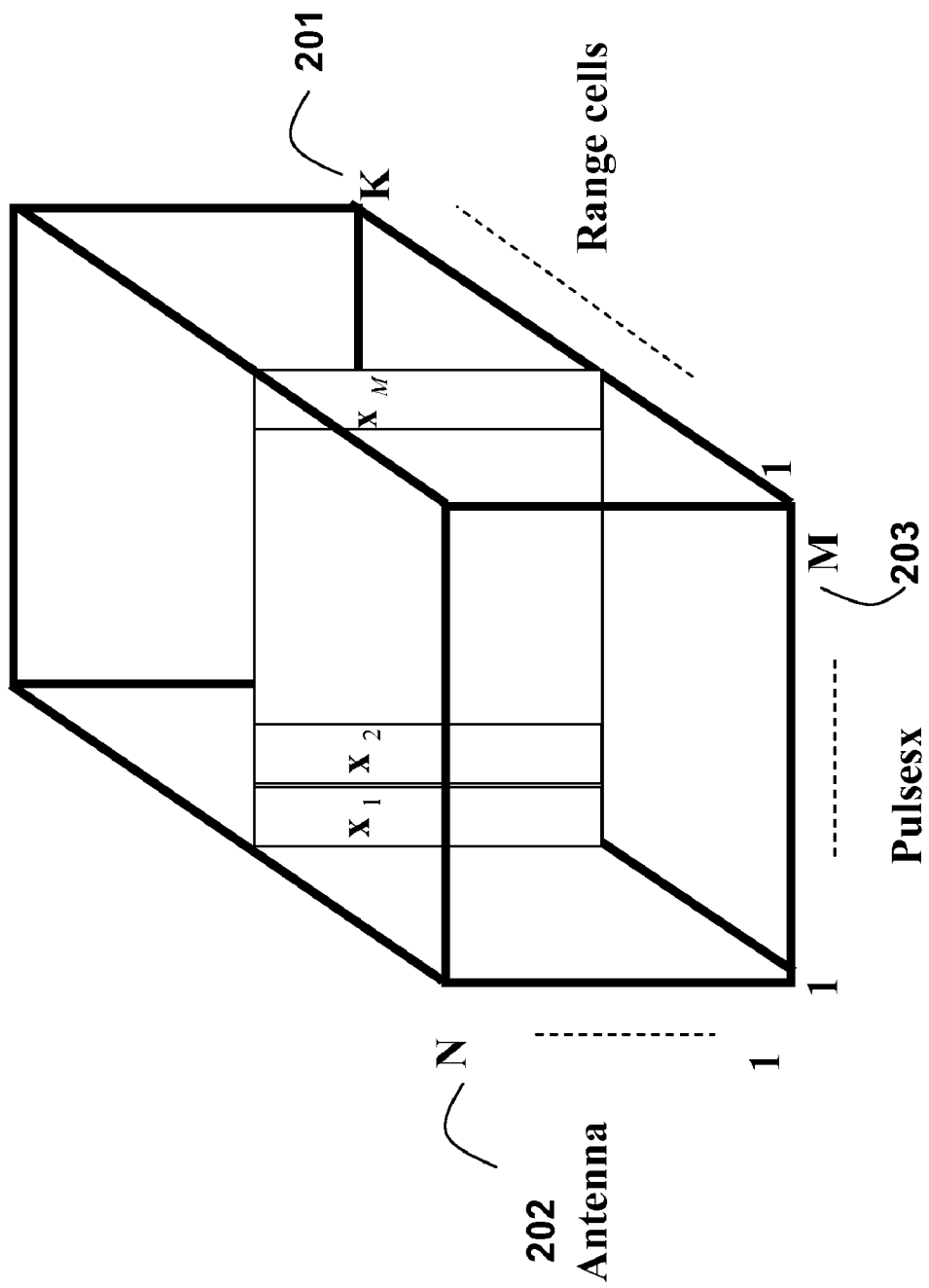
FIG. 2 is schematic of a return signal structure over range cells according to embodiments of the invention.

As shown in FIG. 2, the returned signals are arranged in K range cells 201 for N antennas 202, and M pulses 203. The range cells correspond to a current time instant and previous time instants.

First, we construct a received signal data vector x(k) of length MN by stacking up samples collected over the M pulses 203 from each antenna 202 in the k-th range cell 201, where k=1,2, ..., K correspond to time instances.

To determine whether a target is present in the k-th range cell, a clutter-plus-noise covariance matrix C(k) of dimension MN×MN is determined from neighboring range cells, i.e., adjacent time instances, assuming that the neighboring range cells are impaired by the same clutter, and yet target-free. An index $\Omega_k$ of the range cells is used to determine C(k). Thus, C(k) can be expressed as $$C(k) = \frac{1}{|\Omega(k)|} \sum_{\ell \in \Omega(k)} x(\ell)x(\ell)^H. \quad (1)$$

An optimal space-time filter for clutter suppression is given by $C(k)^{-1}$. Thus, the received signal x(k) is first filtered with $C(k)^{-1}$:

$$z(k)=C(k)^{-1}x(k). \quad (2)$$

Upon obtaining z(k), target detection can be performed. Despite the good performance of Eqn. (2), the matrix inversion $C(k)^{-1}$ for each range cell incurs prohibitive complexity, as described above.

To cope with this problem, different subspace-tracking procedures are known to first reduce the dimension of x(k), before performing the matrix inversion.

We assume that a subspace concentration matrix W has dimensions MN×r, where rank(C(k))<r=MN. The compressed signal after subspace concentration process is given by $$y(k)=W^H x(k), \quad (3)$$

where W is given by the following optimization function $$W = \underset{\tilde{W}}{\operatorname{argmin}} \|y(k) - \tilde{W}\tilde{W}^H x(k)\|^2. \quad (4)$$

The optimization problem in Eqn. (4) can be numerically solved using subspace-tracking procedures, such as FAPI. Next, the compressed signal is filtered with $$r(k)=R(k)^{-1}y(k), \quad (5)$$

where R(k) is the corresponding compressed clutter-plus-noise covariance matrix $$R(k) = \frac{1}{|\Omega(k)|} \sum_{\ell \in \Omega(k)} y(\ell)y(\ell)^H. \quad (6)$$

It is worth noting that R(k) is of dimension r×r, which is significantly smaller than C(k). Finally, target detection is applied on the compressed and filtered signal r(k).

Figure 3:
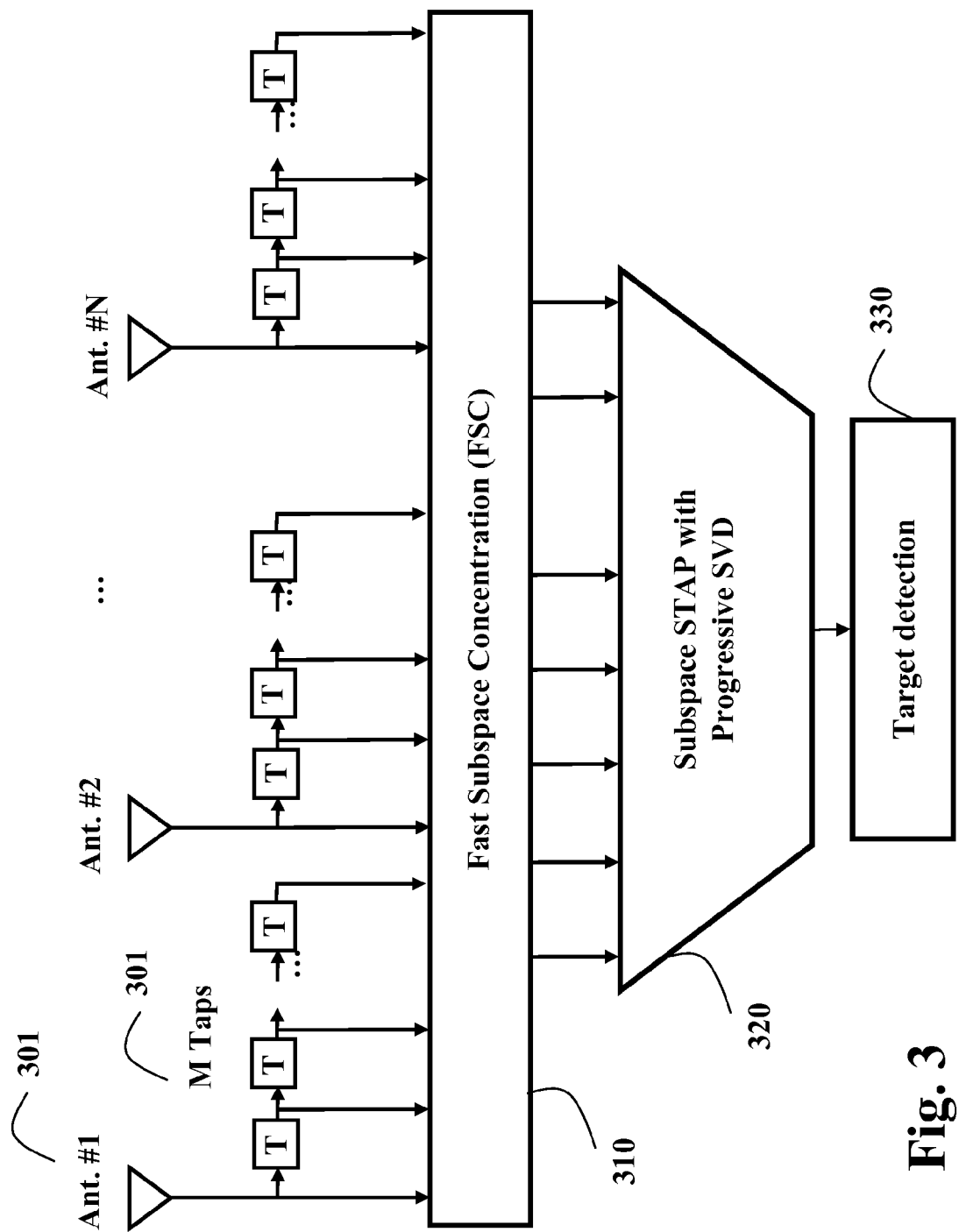
FIG. 3 is a schematic of a low-complexity two-step STAP according to embodiments of the invention.

FIG. 3 shows the two-step STAP according to the invention. Signals received from the N antennas 301 are fed through delay lines with taps T 302. The first step 310 performs a fast subspace concentration according to the invention. The second step performs the PSVD 320, which is followed by target detection 330. In the following, we describe these steps in details. Because the method is iterative, we use W(k) to denote W derived from {x(l); l=1, 2, ..., k}.

Modified Fast Approximated Power Iteration (MFAPI)

The prior art FAPI procedure is an approximation of a projection approximation subspace tracking (PAST) procedure. By exploiting the approximation of W(k)≈W(k−1), FAPI can reduce the computational complexity of PAST from $O(NMr^2)$ to $O(3NMr+5r^2)$. However, the derivation of FAPI does not explicitly take into account the impact of additive noise. As a result, the performance degrades as the signal-to-noise ratio (SNR) decreases.

More specifically, FAPI is derived from an approximated power iteration (API) procedure. In API, the auxiliary matrix Z is updated by $$Z(k) = \frac{1}{\beta}\Theta(k)^H[I_r - g(k)y(k)^H]Z(k-1)\Theta(k)^{-H}, \quad (7)$$

where $$\Theta(k)=W(k-1)^H W(k), \quad (8)$$

and g(k) is of length r.

It is important to observe that the last term $\Theta(k)^{-H}$ in Eqn. (7) incurs $O(r^3)$ operation but also may enhance noise if $\Theta(k)$ is noisy. Motivated by this observation, we provide the following two modifications of Eqn. (7). Recalling that $\Theta$ is nearly orthonormal, it is reasonable to approximate $\Theta(k)^{-H}$ as $$\Theta(k)^{-H}=\Theta(k). \quad (9)$$

As a result, Eqn. (7) becomes $$Z(k) = \frac{1}{\beta}\Theta(k)^H[I_r - g(k)y(k)^H]Z(k-1)\Theta(k). \quad (10)$$

Note that Eqn. (10) has the same computational complexity as Eqn. (7). Further computation reduction can be achieved by observing that W comprises orthonormal column vectors. Hence, we can approximate $\Theta(k)^{-H} \approx I_r$ in Eqn. (8) and Z(k) takes the following form:

$$Z(k) = \frac{1}{\beta}\Theta(k)^H[I_r - g(k)y(k)^H]Z(k-1). \quad (11)$$

It should be pointed out that Eqn. (11) has $O(r^3)$ less operation as compared to Eqns. (7) and (10).

We can re-derive our modified FAPI (MFAPI) by incorporating Eqn. (10) and Eqn. (11). The update functions for Z(k) using Eqns. (10) and (11) are given as follows, respectively.

$$Z(k) = \frac{1}{\beta}(Z(k-1) - g(k)h'(k) - \varepsilon(k)g(k)^H), \quad (12)$$

and $$Z(k) = \frac{1}{\beta}(Z(k-1) - g(k)h'(k)), \quad (13)$$

where the definitions of h'(k) and $\epsilon$(k) are shown in FIG. 4.

In an alternative embodiment, the MFAPI procedures employing Eqn. (12) and Eqn. (13) are referred to as the Noise-Robust MFAPI (NR-MFAPI) and Low Complexity MFAPI (LC-MFAPI). The total computational complexity of NR-MFAPI and LC-MFAPI is $O(3NMr+5r^2)$ and $O(3NMr+3r^2)$, respectively.

Pseudo code for our NR/LC-MFAPI procedures is summarized in FIG. 4.

Progressive SVD (PSVD)

Despite the fact that the output of the subspace concentration, y(k), has a much smaller dimension as compared to x(k), computation of $R(k)^{-1}$ in Eqn. (5) for k=1,2, ..., K can still remain computationally expensive. To circumvent this obstacle, it is important to observe that R(k) and R(k−1) are correlated. This is because they are derived from some common compressed data vectors and clutter variation between consecutive pulse intervals is correlated.

Thus, we provide the PSVD approach by capitalizing on a thin SVD technique. More specifically, the PSVD approach determines $R(k)^{-1}$ in terms of $R(k-1)^{-1}$ and $\Delta R(k)=R(k)-R(k-1)$, assuming $R(k-1)^{-1}$ is given and $\text{rank}(\Delta R(k))=r$. Upon obtaining $R(k)^{-1}$, the same procedures can be repeated to derive $\Delta R(k+1)^{-1}$ recursively.

The low-rank assumption of $\Delta R(k)$ allows us to decompose it into the following form:

$$\Delta R(k) = \sum_{d=1}^{D_k} \alpha_d q_d q_d^H,$$

where $$D_k \stackrel{def}{=} \text{rank}(\Delta R(k)) = r.$$

Furthermore, $q_d$ and $\alpha_d$ are the eigenvectors and the associated eigenvalues, respectively, with $\alpha_1 \geq \alpha_2 \geq \ldots \geq \alpha_{D_k}$. To achieve low-complexity computation, we use the following rank-one approximation to decompose $\Delta R(k)$:

$$\Delta R(k) \approx aa^H. \quad (14)$$

where $a=\sqrt{\alpha_1}q_1$.

Finally, we assume that $R(1)^{-1}$ is given and $R(1)$ can be decomposed as $$R(1)=USU^H. \quad (15)$$

The pseudo code for the rank-one PSVD procedure is shown in FIG. 5.

Note that the computational complexity of the PSVD is $O((3+2m)r^2)$, as compared to $O(r^3)$ for a direct conventional matrix inversion of $R(k)^{-1}$. To fully exploit the advantage of PSVD, we set $(3+2m)=r$. It should be emphasized that, rather than Eqn. (14), higher-rank approximation of $\Delta R(k)$ may lead to better approximation accuracy at the price of higher computational complexity. As described below, the rank-one approximation in Eqn. (14) is usually sufficient to result in satisfactory performance.

Computational Complexity

The total computational complexity of our two-step STAP procedure is $O(3NMr+(8+2m)r^2)$, and $O(3NMr+(5+2m)r^2)$ for PSVD in conjunction with NR-MFAPI and LC-MFAPI, respectively.

Clearly, this stands for a substantial computational reduction as compared to the full matrix inversion $C(k)^{-1}$ of $O((NM)^3)$ operation, particularly for practical values of N and M.

Effect of the Invention

The invention provides a two-step low-complexity space-time adaptive processing (STAP) procedure for a sensing application mounted on a moving platform subject to strong clutters. The STAP procedure first compresses the received signals into a much smaller subspace using the modified FAPI procedure before recursively computing the inverse of the covariance matrix of the compressed data using PSVD.

The resulting procedure has computational complexity of $O(3NMr+(8+2m)r^2)$, and $O(3NMr+(5+2m)r^2)$ for the PSVD in conjunction with NR-MFAPI and LC-MFAPI, respectively.

This is an order-of-magnitude computational complexity reduction as compared to the conventional STAP procedure that requires $O((NM)^3)$ operations.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for detecting a target in a space-time adaptive processing system, comprising the steps of:
   receiving M signals, by N antennas, reflected from the target;
   passing the signals received by each antenna through a delay line with N taps associated with the antenna to generate MN pulses in a receive signal vector x(k);
   arranging the pulses in a three-dimensional MNK matrix with K range cells;
   compressing the MNK matrix to produce a compressed matrix, wherein the compressing is achieved at a low computational complexity that is linearly proportional to MN;
   applying a progressive singular valued decomposition to the compressed matrix to produce an inverse of a clutter covariance matrix C(k) from the inverse of the clutter covariance matrix obtained in a previous time instant, and wherein the clutter covariance matrix obtained within a current time instant, wherein the PSVD provides a low complexity way to compute the inverse of the clutter covariance matrix of the current time instant
   filtering the received signal vector x(k) according to $z(k)=C(k)^{-1}x(k);$ and detecting the target using z(k).

* * * * *